UNITED STATES PATENT OFFICE.

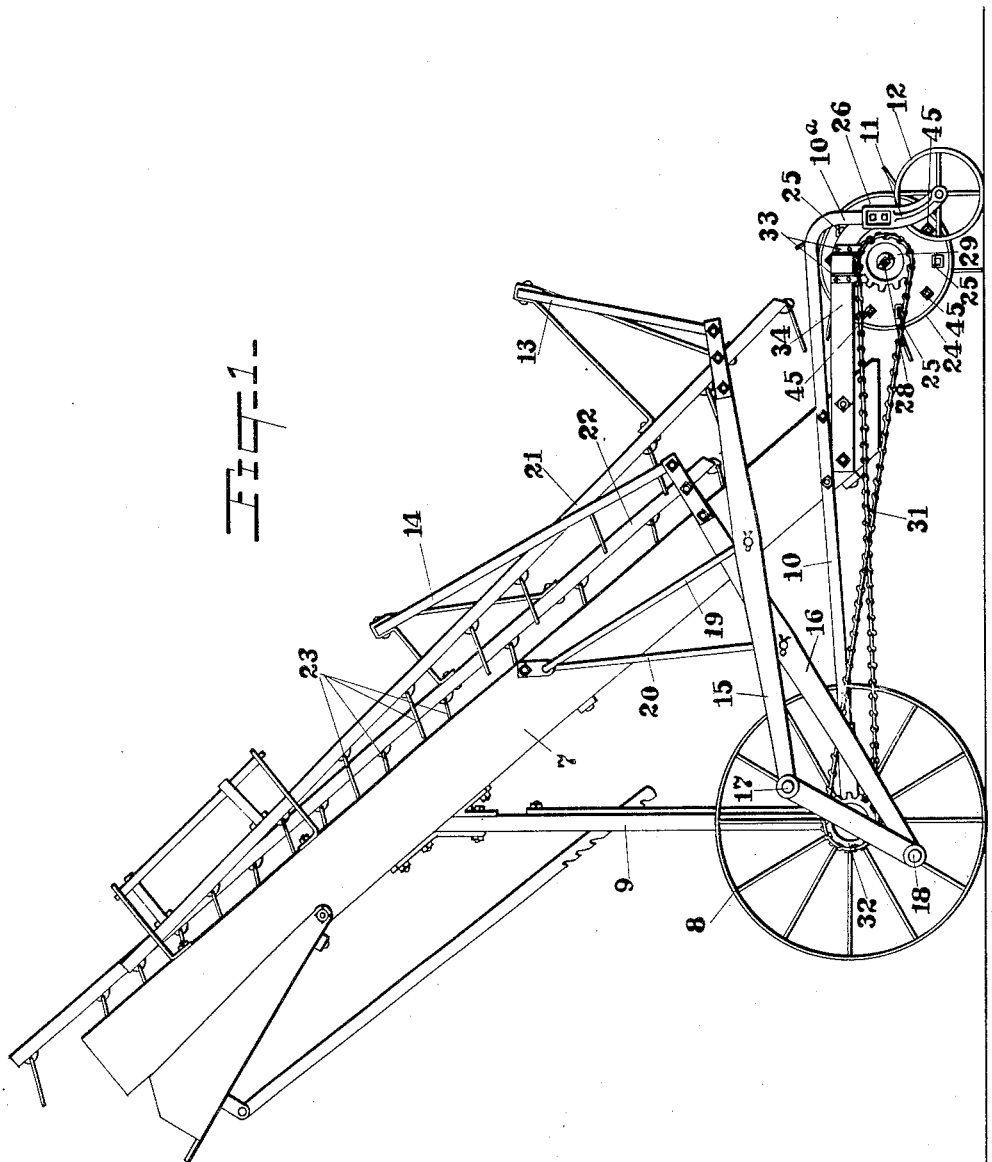

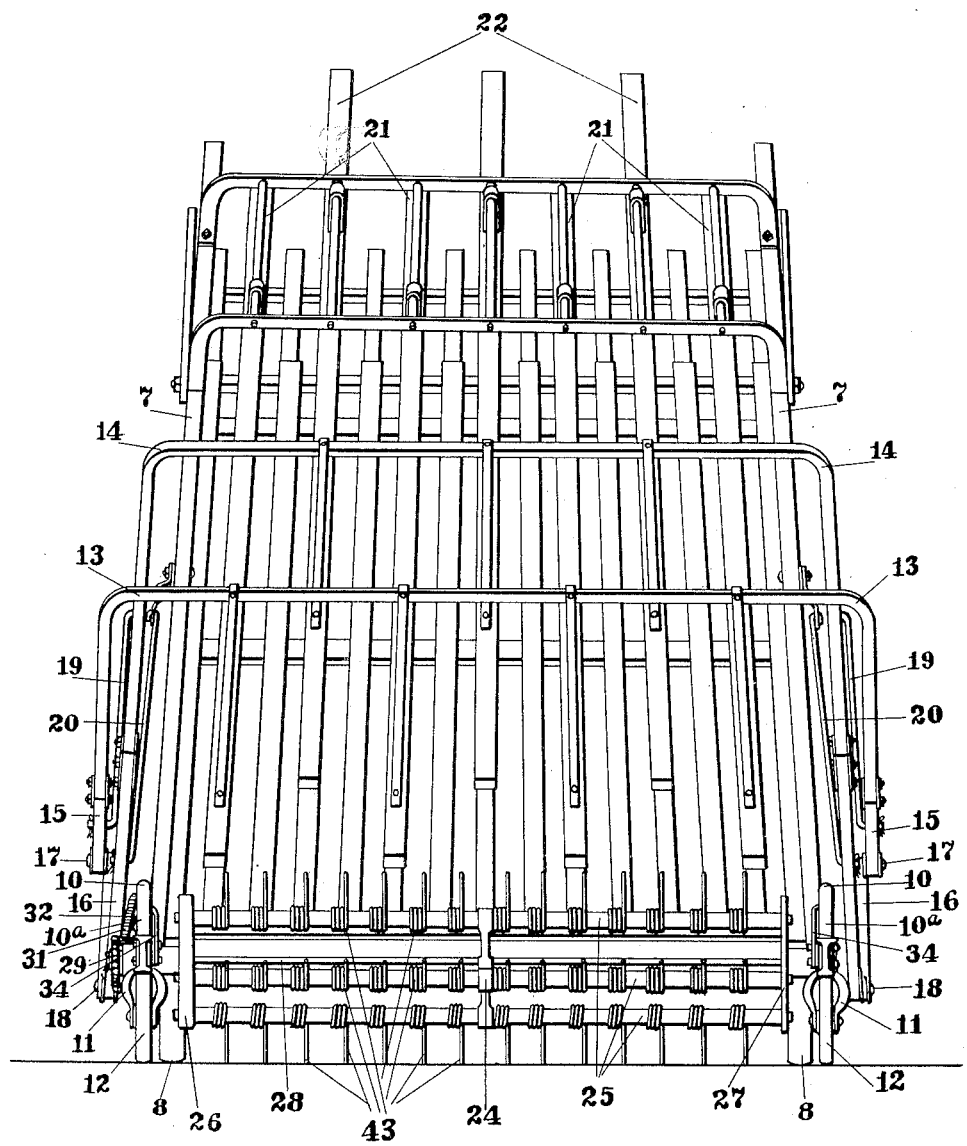

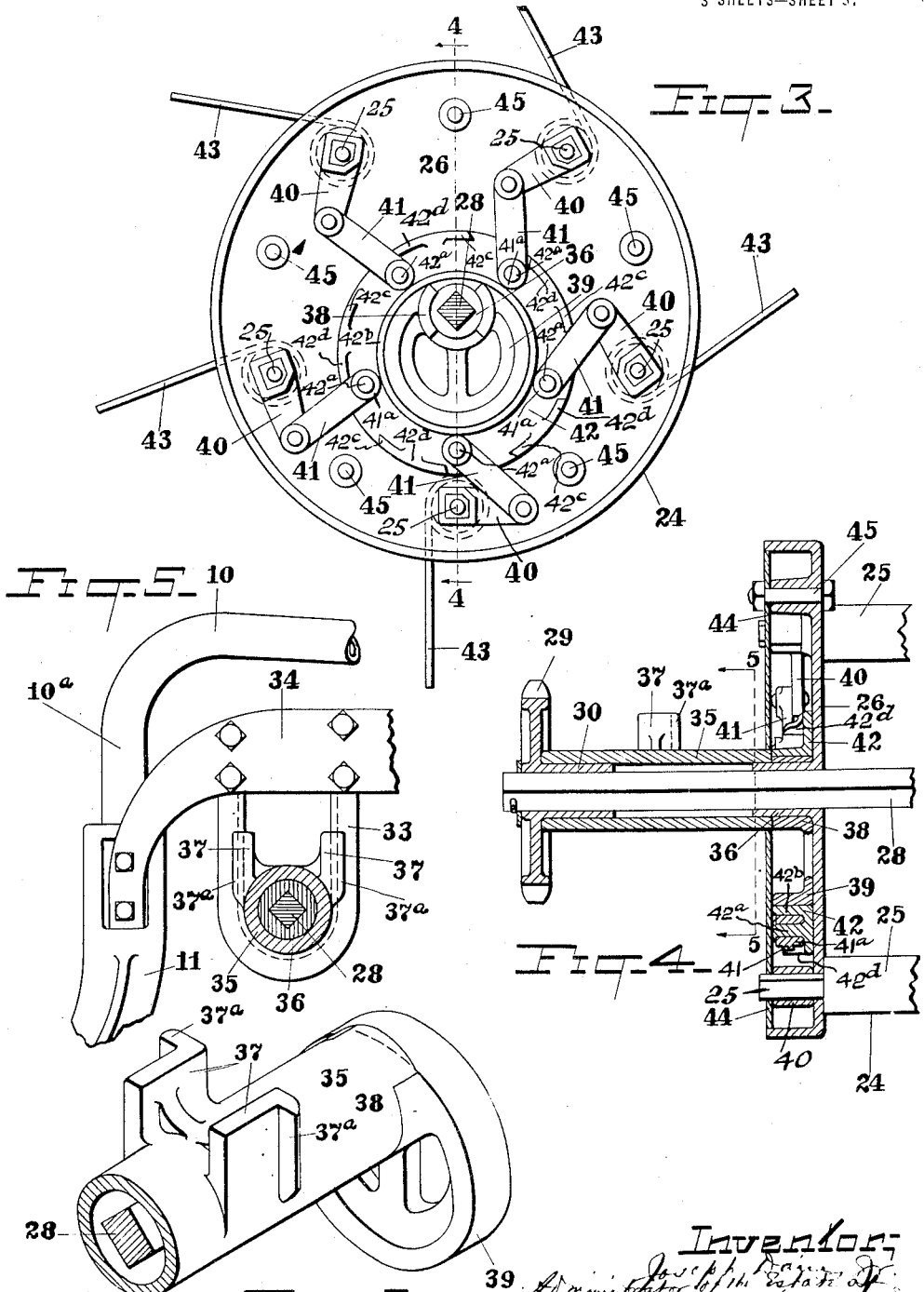

JOSEPH DAIN, DECEASED, BY JOSEPH DAIN, JR., ADMINISTRATOR, OF MOLINE, ILLINOIS, ASSIGNOR TO THE DAIN MANUFACTURING COMPANY OF IOWA, OF OTTUMWA, IOWA, A CORPORATION OF IOWA.

HAY LOADER.

1,411,958.   Specification of Letters Patent.   Patented Apr. 4, 1922.

Application filed October 29, 1919. Serial No. 334,339.

*To all whom it may concern:*

Be it known that I, JOSEPH DAIN, Jr., a citizen of the United States, residing at Moline, in the county of Rock Island and State of Illinois, administrator of the estate of JOSEPH DAIN, deceased, hereby declare that the said JOSEPH DAIN did invent certain new and useful Improvements in Hay Loaders, of which the following is a specification, reference being had to the accompanying drawings.

This invention has to do with hay loaders of the type shown and described in Letters Patent No. 905,151, granted December 1, 1908, to Joseph Dain, in which the hay is raked up over an inclined elevator frame by means of two reciprocating rake frames each composed of a series of raker-bars having teeth which engage the hay and carry it up over the elevator frame as the rake frames reciprocate. The two rake frames are arranged to move upward alternately in close proximity to the elevator frame and to move downwards at a distance from such frame, and they are usually operated by means of pitmen connected with cranks which are driven by the progressive movement of the machine. So far as the present invention is concerned the specific construction of the parts above referred to is not material, as any approved construction for the purpose may be employed.

The object of the present invention is to provide a hay loader of the type referred to with means located back of the lower ends of the rake frames for raking the hay forward and upward so as to feed it to the lowermost teeth of the rake frames as they begin their operative stroke. In the embodiment of the invention illustrated, a rotary rake is employed for this purpose, which is of sufficient length so that it extends from one side of the loader to the other adjacent to and back of the lower end of the elevator frame. This rotary rake is supported by a carriage or wheeled frame having front and rear wheels and is located near the transverse vertical plane of the rear wheels so that it will normally be carried at a substantially uniform distance from the ground; the rake is so mounted that it is self adjustable vertically independently of the rear wheels in order that it may accommodate itself to inequalities in the ground, as when the rear wheels straddle a ridge or mound, if the rake were not free to rise independently of the wheels it would sustain a considerable load which might injure it. The rotary rake is caused to rotate in a direction opposite that of the carrying wheels of the loader by suitable means which permit the self adjustment above mentioned such as crossed chains running over sprocket wheels. The lower portion of the elevator frame is also supported by the carriage instead of bearing on the ground as has heretofore been common practice.

In the accompanying drawings, which illustrate a practical embodiment of this invention,—

Fig. 1 is a side elevation.

Fig. 2 is a rear elevation.

Fig. 3 is an enlarged detail showing one end of the rotary rake with the cover plate removed to show the mechanism which controls the position of the teeth of said rake.

Fig. 4 is a partial longitudinal section on line 4—4 of Fig. 3.

Fig. 5 is a vertical cross section on line 5—5 of Fig. 4, and

Fig. 6 is a perspective view of the eccentric which controls the position of the teeth of the rotary rake and the sleeve which holds said eccentric against rotation.

Referring to the drawings;—7 indicates the elevator frame which is supported in an inclined position on the carrying wheels 8, with which it is connected by an upright frame 9 and side bars 10, as shown in Fig. 1. The side bars 10 extend rearwardly from the front wheel axle and back beyond the side members of the elevator frame and are bent downwardly, as shown at 10ᵃ in Fig. 1, and to these down turned ends are attached brackets 11, which carry caster wheels 12. A four wheeled carriage or frame is thus provided which supports the operating parts of the loader. The down turned portions 10ᵃ of the bars 10 are circular in cross section to form bearings for the caster wheel brackets. By this construction the caster wheels aid in supporting the rear portion of the elevator frame, and the machine therefore travels more easily and may be more easily steered. 13, 14 indicate the two rake frames which extend over the elevator frame and are operated by pitmen 15, 16 connected with cranks 17, 18 respectively, co-axial with the hubs of the wheels 8 and connected in any suitable way so as to rotate therewith. It will be understood that a pair of these pitmen are provided at each side of the machine. The pitmen 15, 16 are fulcrumed on swinging supports 19, 20 pivotally suspended at their upper ends at the sides of the elevator frame 7, as shown in Fig. 1.

21 indicates raker bars which form a part of the rake frame 13, and 22 indicates the raker bars of the rake frame 14. 23 indicates the teeth carried by the raker bars 21, 22. As will be apparent from an inspection of Fig. 1, when either rake frame moves upwardly its raker bars lie close to and are substantially parallel with the bed of the elevator frame, so that its teeth carry the hay up over said frame. On its return or downward stroke, however, it is moved away from the elevator frame, so that its teeth are out of engagement with the hay being carried up by the other rake frame.

The usual practice heretofore has been to extend the raker bars down far enough so that at the beginning of their operative strokes their lowermost teeth engage the ground back of the machine and operate to sweep the hay forward and upward to the elevator frame, but in the machine which forms the subject matter of this application the raker bar teeth do not engage the ground, the hay being raked up and delivered to the rake frames by a rotary rake 24 which extends across the machine adjacent to the lower end of the elevator frame but far enough away from the lower ends of the raker bars so that it does not interfere with their operation. The rake 24 comprises a series of tooth carrying bars 25 connected to heads 26, 27 to form a sort of reel or skeleton drum, as shown in Fig. 2. The heads 26, 27 are carried by and rotate with a square shaft 28, which at one end carries a sprocket wheel 29 having an elongated hub 30 which fits on said shaft, as shown in Fig. 4. The sprocket wheel 29 is driven by a crossed chain 31 from a sprocket wheel 32 operatively connected with one of the carrying wheels 8, as shown in Fig. 1, so that the rake 24 rotates oppositely to the carrying wheels.

The rake 24 is rotatably supported at its ends by means of hangers 33 depending from rearwardly extending bars 34 secured to the side members of the elevator frame 7 and to the parts 10ª of the bars 10, as shown in Figs. 1 and 5, in which hangers are fitted sleeves 35 which form bearings in which the end portions of the shaft 28 are journaled. Fig. 4 shows the construction employed at that end of the shaft on which the sprocket wheel 29 is mounted. As there shown the sleeve 35 at its inner end fits upon a hub 36 provided on the head 26, and at its outer end receives the hub 30 of the sprocket wheel 29. Intermediately of the length of said sleeve it is provided at opposite sides with parallel lugs 37 having side flanges 37ª which bear against the side members of the hanger 33, as shown in Fig. 5. These lugs serve to prevent rotation of said sleeve and guide the same when it moves vertically as the rake rises or falls in effecting its self-adjustment. The inner end of the sleeve 35 is notched or otherwise constructed to form a clutch member arranged to operatively engage the axial portion 38 of an eccentric 39 loosely mounted on the hub 36, so that said sleeve serves to hold said eccentric against rotation. The purpose of the eccentric 39 is to control the position of the teeth of the rotary rake, as will be hereinafter described.

The sleeve at the opposite end of the shaft 28 is similar to the sleeve 35 except that as there is no eccentric at that end it is not fashioned to serve as a clutch member, and it has no sprocket wheel fitted to it.

As shown in Fig. 3 the ends of the tooth carrying bars 25 which project through the head 26 are provided with crank arms 40 which are connected by links 41 with an eccentric strap or ring 42 fitted upon the eccentric 39, this connection being preferably made by providing said links with bearing sleeves 41ª which fit on wrist pins 42ª carried by the eccentric strap; consequently as the heads 26, 27 rotate the tooth carrying bars will be rocked, thereby altering the angular position of the teeth 43, as indicated in said figure. Preferably the strap 42 is provided at its inner margin with an annular flange 42ᵇ and at its outer margin with lugs 42ᶜ, 42ᵈ, which serve as abutments arranged to coact with the links 41 to control the angle of the sets of teeth as the rake rotates, and also to cause the ring 42 to rotate about the eccentric 39. As will be seen from an inspection of Fig. 3 the rotation of the head 26 in a clockwise direction will cause the links 41 at the left to engage the lug 42ᵈ, and consequently the ring 42 will be caused to rotate in the same direction. The eccentric mechanism is so adjusted that, as shown in Fig. 1, the teeth of the rotary rake assume a substantially radial position when nearest the ground and maintain such position during the operative portion of their orbit,—i. e., while they are feeding hay to the rake frames;—they are then folded so that they are withdrawn from the hay easily and without interfering with its being taken and carried up by the raker bars. As shown in Fig. 2 a multiplicity of the teeth 43 are provided mounted at short intervals on the bars 25 and connected therewith in any suitable way so that they rock with said bars.

By this means the ground is thoroughly raked and the hay is lifted and delivered to the rake frames without extending said frames so that they engage the ground. The machine therefore operates more smoothly and with greater efficiency as the action of the rake frames is not disturbed by the vibration and shocks incident to dragging rakes at the lower ends of the raker bars over the ground, as in former constructions; furthermore the rotary raking devices rake up the hay more completely. The caster wheels 12 support the rear portion of the machine so that it travels and steers easily, and they also determine the normal operating height of the rotary rake. As will be apparent from the illustration of Fig. 5, said rake is capable of a limited vertical movement independently of the hangers 33 so that it can accommodate itself to inequalities of the ground without injury.

Preferably the eccentric mechanism is enclosed by a cover plate 44 secured to the head 26 by bolts 45, as shown in Fig. 4.

What I claim as the invention of said JOSEPH DAIN, deceased, is:

1. A hay loader comprising an inclined elevator frame, front and rear wheels supporting said frame, means for moving hay up over said elevator frame, a rotary raking device arranged back of said elevator frame and extending across the lower end thereof for supplying hay thereto, means actuated by the rotation of the front wheels for operating said hay moving means, and separate means also actuated by the rotation of the front wheels for rotating said raking device.

2. A hay loader comprising an inclined elevator frame, front and rear wheels supporting said frame, raker bars adapted to reciprocate over said elevator frame for moving hay up thereover, a rotary raking device arranged back of said elevator frame and co-operating with said raker bars, pitmen actuated by the rotation of the front wheels for operating said hay moving means, and separate means also actuated by the rotation of the front wheels for rotating said raking device.

3. A hay loader comprising an inclined elevator frame, front and rear wheels supporting said frame, hay elevating means co-operating with said elevator frame, and raking means arranged back of said elevator frame for delivering hay to said elevating means, said raking means being movable vertically independently of said rear wheels.

4. A hay loader comprising an inclined elevator frame, carrying wheels therefor, means for moving hay up over said elevator frame, supporting wheels back of the lower portion of said elevator frame, raking means adjacent to said supporting wheels and self-adjustable vertically independently thereof, and means for actuating said raking means to deliver hay to said hay moving means.

5. A hay loader comprising an inclined elevator frame, carrying wheels therefor, caster wheels back of the lower portion of said elevator frame and supporting the same, hay elevating means co-operating with said elevator frame, raking devices adjacent to said caster wheels and self-adjustable vertically independently thereof, and means for actuating said raking device to deliver hay to said hay elevating means.

6. A hay loader comprising an inclined elevator frame, front and rear wheels supporting said frame, hay elevating means co-operating with said elevator frame, and rotary raking means arranged back of the lower portion of said elevator frame, said raking means being self adjustable vertically independently thereof.

7. A hay loader comprising an inclined elevator frame, carrying wheels therefor, caster wheels back of the lower portion of said elevator frame and supporting the same, hay elevating means co-operating with said elevator frame, and rotary raking devices arranged back of the lower portion of said elevator frame, and self adjustable vertically independently of said caster wheels.

8. A hay loader comprising an inclined elevator frame, front and rear wheels supporting said frame, hay elevating means co-operating with said elevator frame, a rotary rake disposed transversely of said elevator frame back of the lower end portion thereof for delivering hay to said elevating means, said rake being self adjustable vertically independently of said rear wheels, and means actuated by forward movement of the loader for rotating said rake.

9. A hay loader comprising an inclined elevator frame, front and rear wheels supporting said frame, reciprocating raker bars operating over said elevator frame, a rotary rake disposed transversely of said elevator frame back of the lower end portion thereof and operating to deliver hay to said raker bars, said rake being self-adjustable vertically independently of said rear wheels, means actuated by forward movement of the loader for operating said raker bars, and separate means actuated by forward movement of the loader for rotating said rake.

10. A hay loader comprising an inclined elevator frame, front and rear wheels supporting said frame, means for moving hay up over said elevator frame, a rotary raking device arranged back of said elevator frame, adjacent to the transverse vertical plane of said rear wheels and extending across the lower end of said elevator frame, said raking device comprising rocking rake teeth, means for rotating said raking device, and means for rocking said rake teeth as the raking device rotates, said raking device being movable vertically independently of the rear wheels.

11. A hay loader comprising an inclined elevator frame, a carriage supporting said elevator frame, means for moving hay up over said elevator frame, a rotary raking device supported by said carriage and arranged back of said elevator frame across the lower end thereof, said raking device comprising rocking rake teeth, means supported by said carriage independently of the elevator frame for rotating said raking device, and means for rocking said rake teeth as the raking device rotates.

12. A hay loader comprising an inclined elevator frame, front and rear wheels supporting said frame, hay elevating means co-operating with said elevator frame, a rotary raking device arranged back of said elevator frame and extending across the lower end thereof, said raking device comprising rocking rake teeth, means supported independently of the elevator frame for rotating said raking device, and means for rocking said rake teeth as the raking device rotates.

13. A hay loader comprising an inclined elevator frame, a carriage having front and rear wheels supporting said frame, hay elevating means co-operating with said elevator frame, a rotary raking device vertically movable independently of and supported by said carriage, said raking device being arranged back of said elevator frame across the lower end thereof, and comprising rocking rake teeth, means for rotating said raking device, and means for rocking said rake teeth as the raking device rotates.

14. A hay loader comprising an inclined elevator frame, a wheeled machine frame supporting said elevator frame and extending rearwardly of the lower end thereof, a rotary rake mounted on the rearwardly extending portion of said machine frame, means mounted on said wheeled frame independently of the elevator frame for rotating said rake, hay elevating devices operating over said elevator frame and co-operating with said rake, and means actuated by forward motion of the loader for operating said hay elevating devices.

15. In a hay loader, the combination with a machine frame, an elevator frame, and hay elevating devices operating thereover, of a rotary rake co-operating with said hay elevating devices, said rake comprising a rotary shaft and rocking rake teeth supported by and rotating with said shaft, an eccentric, means connected with the machine frame for holding said eccentric against rotation, an eccentric strap mounted on said eccentric, means operatively connecting said eccentric strap with said rake teeth, and means for rotating said rake.

16. In a hay loader, the combination with a machine frame, an elevator frame, and hay elevating devices operating thereover, of a rotary rake co-operating with said hay elevating devices, said rake comprising a rotary shaft, heads mounted on said shaft and rotating therewith, and tooth supporting bars mounted in said heads, a non-rotary eccentric adjacent to one of said heads, an eccentric strap mounted on said eccentric, means operatively connecting said eccentric strap with said bars, and means for rotating said rake.

17. In a hay loader, the combination with a machine frame, an elevator frame, and hay elevating devices operating thereover, of a rotary rake co-operating with said hay elevating devices, said rake comprising a rotary shaft, rake tooth supporting devices mounted on said shaft and rotating therewith, and rocking rake teeth carried by said supporting devices, an eccentric, a sleeve non-rotatably engaging said eccentric, an eccentric strap mounted on said eccentric and operating to rock said rake teeth as the rake rotates, and means for rotating said rake.

18. In a hay loader, the combination with a machine frame, an elevator frame and hay elevating devices operating thereover, of a rotary rake cooperating with said elevating devices, said rake comprising a rotary shaft mounted on the machine frame, heads mounted on said shaft and rotating therewith, rocking rake tooth supporting devices carried by said heads, an eccentric associated with one of said heads, means mounted on the machine frame for holding said eccentric against rotation, an eccentric strap mounted on said eccentric, means operatively connecting said eccentric strap with said tooth supporting devices, and means for rotating said shaft as the loader progresses.

19. In a hay loader, the combination with a machine frame having front and rear wheels, an elevator frame, and hay elevating devices operating thereover, of a rotary rake cooperating with said hay elevating devices, said rake comprising a rotary shaft mounted on said machine frame and vertically movable independently thereof, heads mounted to rotate with said shaft, rocking rake tooth supporting bars carried by said heads, an eccentric associated with one of said heads, means non-rotatably connecting said eccentric with said machine frame, an eccentric strap operating on said eccentric, means operatively connecting said eccentric strap with said bars, and means for rotating said rake as the loader progresses.

20. In a hay loader, the combination with a machine frame having front and rear wheels, an elevator frame, and hay elevating devices operating thereover, of a rotary rake cooperating with said hay elevating devices, said rake comprising a rotary shaft mounted on said machine frame and vertically movable independently thereof, heads mounted to rotate with said shaft, rocking rake tooth supporting bars carried by said heads, an eccentric associated with one of said heads, means non-rotatably connecting said eccentric with said machine frame, an eccentric strap operating on said eccentric, means operatively connecting said eccentric strap with said bars, and means independent of the elevator frame and driven by the front wheels for rotating said rake.

JOSEPH DAIN, Jr.,
*Administrator of Joseph Dain, deceased.*